UNITED STATES PATENT OFFICE.

EARL V. WAGNER, OF SCRANTON, PENNSYLVANIA, ASSIGNOR TO THE WAGNER FIRE BRICK COMPANY, OF HELENA, MONTANA.

PLASTIC COMPOSITION.

1,198,172.  Specification of Letters Patent.  Patented Sept. 12, 1916.

No Drawing.  Application filed January 8, 1916. Serial No. 70,985.

*To all whom it may concern:*

Be it known that I, EARL V. WAGNER, a citizen of the United States, residing at Scranton, in the county of Lackawanna and State of Pennsylvania, have invented a new and useful Plastic Composition, of which the following is a specification.

My composition consists of the following named ingredients combined in substantially the proportions here stated, namely,

| | |
|---|---|
| Coal ash | .98 cu. yd. |
| Crude fibrous asbestos | .01 cu. yd. |
| Soluble sodium silicate | .01 cu. yd. |
| Water | 30 to 35 gals. |

These proportions may in some cases be advantageously varied.

My process consists of the following steps: Grind and mingle the coal ash, crude fibrous asbestos and soluble sodium silicate and then add water and mix until thoroughly plastic. Press the plastic mass into the shape or form desired; dry for seven to eight hours in a closed oven at a temperature of 400 to 600 degrees Fahrenheit; then bake in a baking oven, closed type, gradually increasing the temperature to 2000 to 2200 degrees Fahrenheit, for seven to eight days. Cool gradually; when sufficiently cool to be handled dip in a saturated solution of soluble sodium silicate; refire at a temperature of 1000 to 1500 degrees Fahrenheit, according to the fusion point of the soluble sodium silicate, which gives the desired glaze and also the water proof qualities.

I am aware that, prior to my invention and discovery, coal ashes and asbestos fiber have been combined with lime and plaster of Paris; and with lime, plaster of Paris and alum; and with lime, plaster of Paris and marl; for the purpose of making artificial stones and plastering materials; that asbestos has been mixed with various proportions of a number of pulverulent substances, such as gypsum, lime, chalk, fire clay, graphite, pumice, and ashes, for making asbestos cements and building materials; and that ashes, hydraulic cement, sand, gypsum, lime, and similar solids, have been treated with a compound containing protoxid of lead, sulfate of zinc, alum, and silicate of soda, for the purpose of making artificial marbles and stones; but, in these instances, I am not aware that any such combinations have been burned to produce tiles and pipes.

The presence of lime, plaster of Paris, cement, and similar substances having cohesive and binder properties in the compositions referred to, if subjected to the burning processes necessary to make bricks having great cohesive, crushing and tensile properties, will cause the molded masses to become incohesive, or brittle and fragile, or to disintegrate. On the other hand, if small percentages of crude fibrous asbestos and soluble sodium silicate be added to and thoroughly mixed with finely ground coal ashes and then moistened with water, the mass thus obtained may be readily molded into pipes and tiles, in the manner specified, which, when dried and burned in the manner specified, and treated with a saturated solution of soluble sodium silicate, and then burned again, as indicated, will result in the production of building tiles, sewer pipes and bricks impervious to moisture and will possess great strength and durability.

I am not aware that the ingredients specified, mixed, molded, burned, and treated, as specified, in the proportions and in the manner stated, or in any other proportions, or at all, have been used to make building tiles, sewer pipes, bricks, or other articles of manufacture, prior to my invention and discovery thereof.

What I claim is:

1. The herein described plastic composition consisting of coal ash, crude fibrous asbestos, soluble sodium silicate, and water mixed, molded and burned, substantially as described.

2. The herein described plastic composition for making sewer pipe and tile for sewer and building purposes, consisting of coal ash, .98 cu. yd.; crude fibrous asbestos, .01 cu. yd.; soluble sodium silicate, .01 cu. yd.; water, 30 to 35 gals. mixed, molded, and burned, substantially as described.

EARL V. WAGNER.

Witnesses:
 HOMER C. HUTCHINS,
 DAVID J. JONES.